(12) United States Patent
Zhao et al.

(10) Patent No.: US 8,193,673 B2
(45) Date of Patent: Jun. 5, 2012

(54) BRUSH MOTOR

(75) Inventors: Jian Zhao, Shenzhen (CN); Yong Li, Shenzhen (CN); Yue Li, Hong Kong (CN); Mao Xiong Jiang, Shenzhen (CN); Li Sheng Liu, Shenzhen (CN)

(73) Assignee: Johnson Electric S.A., Murten (CH)

( * ) Notice: Subject to any disclaimer, the term of this patent is extended or adjusted under 35 U.S.C. 154(b) by 160 days.

(21) Appl. No.: 12/837,688

(22) Filed: Jul. 16, 2010

(65) Prior Publication Data

US 2011/0012469 A1    Jan. 20, 2011

(30) Foreign Application Priority Data

Jul. 16, 2009  (CN) .......................... 2009 1 0108770

(51) Int. Cl.
*H02K 23/26* (2006.01)
*H02K 23/32* (2006.01)
*H02K 23/34* (2006.01)

(52) U.S. Cl. ..................... 310/198; 310/207; 310/233

(58) Field of Classification Search .................. 310/195, 310/198, 200, 203, 205–207
See application file for complete search history.

(56) References Cited

U.S. PATENT DOCUMENTS

| | | | |
|---|---|---|---|
| 4,404,485 A * | 9/1983 | Ban et al. ..................... 310/198 |
| 7,388,312 B2 | 6/2008 | Hyodo et al. | |
| 7,557,484 B2 * | 7/2009 | Kawashima et al. ......... 310/225 |
| 7,560,848 B2 * | 7/2009 | Roos et al. .................... 310/234 |
| 7,888,836 B2 * | 2/2011 | Santo ............................ 310/179 |
| 8,079,133 B2 * | 12/2011 | Roos ................................ 29/598 |
| 2008/0093943 A1 * | 4/2008 | Roos ........................ 310/154.45 |
| 2010/0084941 A1 * | 4/2010 | Miyajima ..................... 310/198 |
| 2011/0127871 A1 * | 6/2011 | Roos ............................. 310/177 |

FOREIGN PATENT DOCUMENTS

| DE | 10 2006 061673 | * 7/2008 |
|---|---|---|
| EP | 0419293 | * 3/1991 |

* cited by examiner

*Primary Examiner* — Burton Mullins
(74) *Attorney, Agent, or Firm* — Muncy, Geissler, Olds & Lowe, PLLC

(57) ABSTRACT

A brush motor includes a stator with 2P magnetic poles and a rotor which includes a rotor core, a commutator and windings wound on the rotor core. The rotor core includes N teeth with a slot formed between adjacent teeth. The commutator includes M segments represented by $Z_1 \ldots Z_X \ldots Z_Y \ldots Z_M$, wherein M, N, P, Y and X are integers and M is odd and greater than N. Each winding includes a start connected to a segment $Z_X$ and an end connected to another segment $Z_Y$. Each winding includes at least one coil wound about a corresponding tooth or set of teeth. Some of the windings include a plurality of coils wound on different teeth. The total number of turns of the coils for each winding is substantially the same. A winding unit consisting of a plurality of windings is connected between each pair of adjacent segments. $Z_X$ and $Z_Y$ satisfy the following equation: $|Y-X|=(M\pm 1)/P$.

11 Claims, 3 Drawing Sheets

| winding | segment | tooth (turns) | tooth (turns) | segment |
|---|---|---|---|---|
| 501 | 1 | A ( 15 ) | | 14 |
| 502 | 14 | A ( 9 ) | e ( 6 ) | 2 |
| 503 | 2 | A ( 3 ) | e ( 12 ) | 15 |
| 504 | 15 | e ( 12 ) | D ( 13 ) | 3 |
| 505 | 3 | e ( 6 ) | D ( 9 ) | 16 |
| 506 | 16 | D ( 15 ) | | 4 |
| 507 | 4 | D ( 9 ) | c ( 6 ) | 17 |
| 508 | 17 | D ( 3 ) | c ( 12 ) | 5 |
| 509 | 5 | c ( 12 ) | B ( 3 ) | 18 |
| 510 | 18 | c ( 6 ) | B ( 9 ) | 6 |
| 511 | 6 | B ( 15 ) | | 19 |
| 512 | 19 | B ( 9 ) | a ( 6 ) | 7 |
| 513 | 7 | B ( 3 ) | a ( 12 ) | 20 |
| 514 | 20 | a ( 12 ) | E ( 3 ) | 8 |
| 515 | 8 | a ( 6 ) | E ( 9 ) | 21 |
| 516 | 21 | E ( 15 ) | | 9 |
| 517 | 9 | E ( 9 ) | d ( 6 ) | 22 |
| 518 | 22 | E ( 3 ) | d ( 12 ) | 10 |
| 519 | 10 | d ( 12 ) | C ( 3 ) | 23 |
| 520 | 23 | d ( 6 ) | C ( 9 ) | 11 |
| 521 | 11 | C ( 15 ) | | 24 |
| 522 | 24 | C ( 9 ) | b ( 6 ) | 12 |
| 523 | 12 | C ( 3 ) | b ( 12 ) | 25 |
| 524 | 25 | b ( 12 ) | A ( 3 ) | 3 |
| 525 | 3 | b ( 6 ) | A ( 9 ) | 1 |

FIG. 2

| winding | segment | teeth | | | turns | teeth | | | turns | segment |
|---|---|---|---|---|---|---|---|---|---|---|
| 601 | 1 | O | A | B | 3 | | | | | 24 |
| 602 | 24 | O | A | B | 1 | d | e | f | 2 | 2 |
| 603 | 2 | d | e | f | 2 | H | I | J | 1 | 25 |
| 604 | 25 | H | I | J | 3 | | | | | 3 |
| 605 | 3 | H | I | J | 1 | l | m | n | 2 | 26 |
| 606 | 26 | l | m | n | 2 | A | B | C | 1 | 4 |
| 607 | 4 | A | B | C | 3 | | | | | 27 |
| 608 | 27 | A | B | C | 1 | e | f | g | 2 | 5 |
| 609 | 5 | e | f | g | 2 | I | J | K | 1 | 28 |
| 610 | 28 | I | J | K | 3 | | | | | 6 |
| 611 | 6 | I | J | K | 1 | m | n | o | 2 | 29 |
| 612 | 29 | m | n | o | 2 | B | C | D | 1 | 7 |
| 613 | 7 | B | C | D | 3 | | | | | 30 |
| 614 | 30 | B | C | D | 1 | f | g | h | 2 | 8 |
| 615 | 8 | f | g | h | 2 | J | K | L | 1 | 31 |
| 616 | 31 | J | K | L | 3 | | | | | 9 |
| 617 | 9 | J | K | L | 1 | n | o | a | 2 | 32 |
| 618 | 32 | n | o | a | 2 | C | D | E | 1 | 10 |
| 619 | 10 | C | D | E | 3 | | | | | 33 |
| 620 | 33 | C | D | E | 1 | g | h | i | 2 | 11 |
| 621 | 11 | g | h | i | 2 | K | L | M | 1 | 34 |
| 622 | 34 | K | L | M | 3 | | | | | 12 |
| 623 | 12 | K | L | M | 1 | o | a | b | 2 | 35 |
| 624 | 35 | o | a | b | 2 | D | E | F | 1 | 13 |
| 625 | 13 | D | E | F | 3 | | | | | 36 |
| 626 | 36 | D | E | F | 1 | h | i | j | 2 | 14 |
| 627 | 14 | h | i | j | 2 | L | M | N | 1 | 37 |
| 628 | 37 | L | M | N | 3 | | | | | 15 |
| 629 | 15 | L | M | N | 1 | a | b | c | 2 | 38 |
| 630 | 38 | a | b | c | 2 | E | F | G | 1 | 16 |
| 631 | 16 | E | F | G | 3 | | | | | 39 |
| 632 | 39 | E | F | G | 1 | i | j | k | 2 | 17 |
| 633 | 17 | i | j | k | 2 | M | N | O | 1 | 40 |
| 634 | 40 | M | N | O | 3 | | | | | 18 |
| 635 | 18 | M | N | O | 1 | b | c | d | 2 | 41 |
| 636 | 41 | b | c | d | 2 | F | G | H | 1 | 19 |
| 637 | 19 | F | G | H | 3 | | | | | 42 |
| 638 | 42 | F | G | H | 1 | j | k | l | 2 | 20 |
| 639 | 20 | j | k | l | 2 | N | O | A | 1 | 43 |
| 640 | 43 | N | O | A | 3 | | | | | 21 |
| 641 | 21 | N | O | A | 1 | c | d | e | 2 | 44 |
| 642 | 44 | c | d | e | 2 | G | H | I | 1 | 22 |
| 643 | 22 | G | H | I | 3 | | | | | 45 |
| 644 | 45 | G | H | I | 1 | k | l | m | 2 | 23 |
| 645 | 23 | k | l | m | 2 | O | A | B | 1 | 1 |

FIG. 4

BRUSH MOTOR

CROSS REFERENCE TO RELATED APPLICATIONS

This non-provisional patent application claims priority under 35 U.S.C. §119(a) from Patent Application No. 200910108770.7 filed in The People's Republic of China on Jul. 16, 2009.

FIELD OF THE INVENTION

This invention relates to brush motors and in particular to a winding for a brush motor.

BACKGROUND OF THE INVENTION

A typical brush motor comprises a stator and a rotor which comprises a rotor core having a number of salient rotor poles separated by slots, a commutator and windings wound about the poles of the rotor core. An insulator may be disposed within each slot for insulating the rotor core from the windings. A traditional brush wave winding motor usually adopts the same number of rotor slots (rotor poles) and commutator segments, for example 25 rotor slots and 25 commutator segments.

It is usual to describe the construction of a motor by the number of stator poles, rotor poles and commutator segments. As the number of rotor poles is equal to the number of slots defined by the rotor poles, it is conventional to refer to the number of rotor poles as the number of slots to avoid confusion with the stator poles. It is also conventional to refer to commutator segments as bars, e.g. a 4 pole 25 slot 25 bar motor refers to a motor with 4 stator poles, 25 rotor poles and 25 commutator segments. If the number of commutator segments is equal to the number of rotor poles, as is the usual case, they are not mentioned thus the motor of the above example would simply be referred to as a 4 pole 25 slot motor.

However, the slot fill factor (the ratio of the total cross sectional area of the insulated wires within the slot and the cross sectional area of the slot) of this kind of traditional brush wave winding motor is relatively low, especially when a small motor has a large number of narrow rotor slots, which limits the performance of the motor.

Hence there is a desire for an improved brush motor with a high slot fill factor.

SUMMARY OF THE INVENTION

Accordingly, in one aspect thereof, the present invention provides a brush motor comprising a stator with 2P poles and a rotor comprising a rotor core, a commutator and windings wound about teeth of the rotor core, wherein the rotor core comprises N teeth with a slot formed between adjacent teeth; the commutator comprises M segments represented by $Z_1 \ldots Z_X \ldots Z_Y \ldots Z_M$, M being greater than N, N, P, Y and X being integers, M being an odd integer; each winding comprises a start connected to a segment $Z_X$ and an end connected to another segment $Z_Y$, with $Z_X$ and $Z_Y$ satisfying the equation: $|Y-X|=(M\pm1)/P$; each winding comprises at least one coil wound on corresponding tooth/teeth, some of the windings comprise a plurality of coils wound on different teeth, the total number of turns of the coils of each winding being substantially the same; and a winding unit formed by a plurality of windings is connected between every pair of adjacent segments.

Preferably, said some of the windings comprising a plurality of coils each have two coils wound about different teeth in opposite directions.

Preferably, the two coils of each of the windings having two coils are connected between two segments and cooperatively act as a virtual wave winding connected between said two segments.

Preferably, the two coils of the same winding have a different number of turns.

Preferably, each pair of adjacent windings have coils wound about a common tooth or group of teeth.

Preferably, in some of the winding units, the coils of adjacent pairs of windings are wound about the same teeth.

Preferably, each coil is wound about one tooth.

Preferably, the motor comprises 4 poles, 5 teeth, 25 segments and 25 windings.

Alternatively, each coil is wound about multiple teeth.

Preferably, the motor comprises 4 poles, 15 teeth, 45 segments and 45 windings, with each coil being wound about 3 teeth.

Preferably, each winding unit comprises only two windings.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

FIG. 2 is a winding table illustrating the connection relationship between the winding, teeth and segments for the brush motor of FIG. 1;

FIG. 4 is a winding table illustrating the connection relationship between the winding, teeth and segments for the brush motor of FIG. 3.

DETAILED DESCRIPTION OF THE PREFERRED EMBODIMENTS

A brush motor in accordance with the present invention includes a stator with 2P magnetic poles and a rotor which includes a rotor core, a commutator and windings wound on the rotor core. The rotor core includes N teeth with a slot formed between adjacent teeth. The commutator includes M segments represented by Z1 ... ZX ... ZY ... ZM, M being greater than N, M being an odd integer, and N, P, Y and X being integers. Each winding includes a start connected to a segment ZX and an end connected to another segment ZY, ZX and ZY satisfies the equation: $|Y-X|=(M\pm1)/P$. Each winding includes at least one coil wound on a corresponding tooth or set of teeth. Some of the windings each includes a plurality of coils wound on different teeth. The total turns of the coils for each winding is substantially the same. A winding unit comprising a plurality of windings is connected between each pair of adjacent segments.

The motor may be a PMDC (permanent magnet direct current) motor or a universal motor and may be used for washing machines, blenders, juicers, hair-dryers and vacuum cleaners etc.

The following description takes a PMDC motor with 4 poles, 5 slots and 25 bars (segments), as an example.

Figure 1:
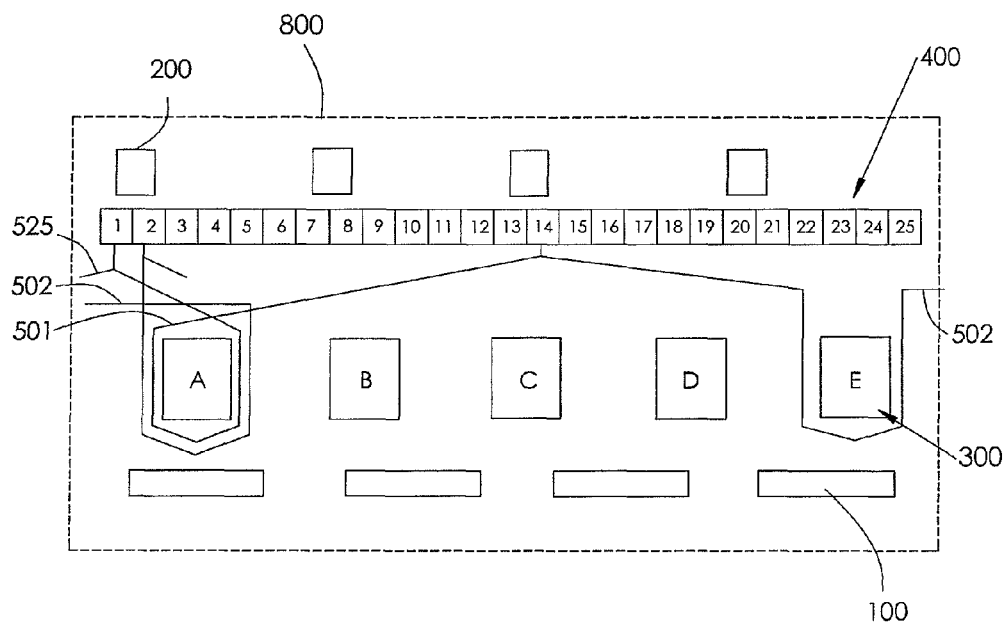
FIG. 1 illustrates a winding scheme for a brush motor in accordance with a preferred embodiment of the present invention.

Referring to FIGS. 1 to 2, the motor 800 comprises a stator which has 4 magnets 100 which form 4 stator poles, 4 brushes 200, and a rotor which has a rotor core 300 and a commutator 400. The rotor core 300 has 5 teeth A~E with a slot formed between adjacent teeth. The commutator 400 comprises 25 segments 1~25. The rotor further comprises 25 windings 501~525 (only two windings 501, 502 shown in FIG. 1) wound about the teeth and accommodated by the slots. Each winding has a start and an end respectively connected to two of the segments. The windings 501~525 are wound sequentially according to the winding table as shown in FIG. 2. For example, the winding 501 comprises a coil wound on the tooth A with 15 turns. The start of the winding 501 is connected to segment 1 and the end thereof is connected to segment 14. The winding 501 wound on the tooth A forms a wave winding connected between the segments 1 and 14. The winding 502 comprises two coils respectively wound about teeth A and E. The start of the winding 502 is connected to segment 14 and the end thereof is connected to segment 2. The windings 501 and 502 constitute a winding unit connected between adjacent segments 1 and 2. In the winding 502, the coil wound about the tooth A and the coil wound about the tooth E may have a different number of turns. For example, the coil wound on the tooth A has 9 turns and the coil wound on the tooth E has 6 turns. The total number of turns of the winding 502 is equal to that of the winding 501. In the winding 502, the vector synthesize of back-EMF (Electromotive Force) generated by the coil wound about the tooth A and the coil wound about the tooth E corresponds to the segments 2 and 14 to which the winding 502 connects. That is, the two coils for the winding 502 connected between segments 2 and 14 cooperatively act as a virtual wave winding connected between the segments 2 and 14. The coil wound on the tooth A and the coil wound on the tooth E are wound in opposite directions.

As shown in FIG. 2, capital letters represent that the coils are wound on the corresponding teeth in a clockwise direction. Small letters represent that the coils are wound on the corresponding teeth in an anti-clockwise direction. The number near the letter represents the number of the turns of the coils wound on the corresponding tooth. Each pair of adjacent windings have coils wound on a common tooth. For example, in the winding 501, the coil is wound on tooth A. In the winding 502, the first coil is also wound on tooth A. In the winding unit connected between segments 14 and 15, the coils of the winding 502 and the coils of the winding 503 are wound on the same teeth A and E.

Figure 3:
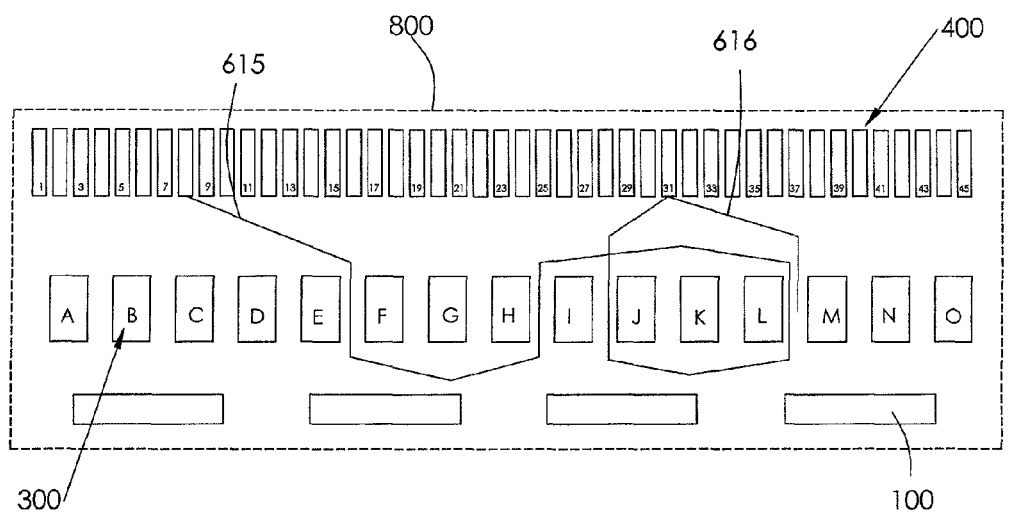
FIG. 3 illustrates a winding scheme for a brush motor in accordance with another embodiment of the present invention.

FIG. 3 shows a winding scheme for a brush motor in accordance with another embodiment of the present invention. The motor of this embodiment is a 4 pole, 15 slot, 45 bar motor. Thus there are 4 stator poles formed by magnets 100, 15 rotor teeth (A~O) on the rotor core 300 and 45 segments (1~45) on the commutator 400. There are 45 rotor windings (600~645), with each coil of the windings spanning three of the teeth, i.e. being wound about three teeth. FIG. 4 is a winding table illustrating the connection relationship between the winding, teeth and segments for the brush motor of FIG. 3. The winding scheme for this motor is similar the winding scheme for the motor of the first embodiment except each coil is wound on three teeth. Some of the windings 601~645 are constituted of one coil and the other windings are constituted of two coils wound in opposite directions. Each pair of adjacent windings have coils wound on a group of common teeth. For example, in the winding 601, the coil is wound on teeth O, A and B. In the winding 602, the first coil is wound on teeth O, A and B. The second coil of the winding 602 and the first coil of the winding 603 are wound on the common teeth d, e and f.

Understandably, in some motors, some coils for the same winding may have the same number of turns. But preferably, the coils for the same winding connected between two segments cooperatively act as a virtual wave winding connected between the two segments.

Although the stator poles have been illustrates as being formed by separate permanent magnets, they may be formed by a common permanent magnet or by electro-magnets i.e. by stator coils.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

For example, although the stator poles have been illustrates as being formed by separate permanent magnets, they may be formed by a common permanent magnet or by electro-magnets i.e. by stator coils.

The invention claimed is:

1. A brush motor comprising a stator with 2P poles and a rotor comprising a rotor core, a commutator and windings wound about teeth of the rotor core,
    wherein the rotor core comprises N teeth with a slot formed between adjacent teeth;
    the commutator comprises M segments represented by $Z_1 \ldots Z_X \ldots Z_Y \ldots Z_M$, M being greater than N, N, P, Y and X being integers, M being an odd integer;
    each winding comprises a start connected to a segment $Z_X$ and an end connected to another segment $Z_Y$, $Z_X$ and $Z_Y$ satisfying the following equation: $|Y-X|=(M\pm1)/P$;
    each winding comprises at least one coil wound on corresponding tooth/teeth, some of the windings comprise a plurality of coils wound on different teeth, the total number of turns of the coils of each winding being substantially the same; and
    a winding unit formed by a plurality of windings is connected between every pair of adjacent segments.

2. The brush motor of claim 1, wherein said some of the windings comprising a plurality of coils each have two coils wound about different teeth in opposite directions.

3. The brush motor of claim 2, wherein the two coils of each of the windings having two coils are connected between two segments and cooperatively act as a virtual wave winding connected between said two segments.

4. The brush motor of claim 2, wherein the two coils of the same winding have a different number of turns.

5. The brush motor of claim 2, wherein each pair of adjacent windings have coils wound about a common tooth or group of teeth.

6. The brush motor of claim 5, wherein in some of the winding units, the coils of adjacent pairs of windings are wound about the same teeth.

7. The brush motor of claim 1, wherein each coil is wound about one tooth.

8. The brush motor of claim 7, wherein the motor comprises 4 poles, 5 teeth, 25 segments and 25 windings.

9. The brush motor of claim 1, wherein each coil is wound about multiple teeth.

10. The brush motor of claim 9, wherein the motor comprises 4 poles, 15 teeth, 45 segments and 45 windings, with each coil being wound about 3 teeth.

11. The brush motor of claim 1, wherein each winding unit comprises only two windings.

* * * * *